United States Patent
Cao et al.

(10) Patent No.: US 11,915,601 B2
(45) Date of Patent: Feb. 27, 2024

(54) INSPECTION ROUTE COMMUNICATIONS

(71) Applicant: QUALCOMM Incorporated, San Diego, CA (US)

(72) Inventors: Yiqing Cao, Beijing (CN); Wanshi Chen, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/247,012

(22) Filed: Nov. 24, 2020

(65) Prior Publication Data

US 2022/0165167 A1 May 26, 2022

Related U.S. Application Data

(63) Continuation of application No. PCT/CN2019/088248, filed on May 24, 2019.

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *H04L 5/0005* (2013.01); *H04W 4/021* (2013.01); *B64U 2101/30* (2023.01)

(58) Field of Classification Search
CPC ............... G08G 5/0069; B64C 39/024; B64C 2201/123; B64C 2201/127; H04L 5/0005; H04W 4/021
See application file for complete search history.

(56) References Cited

U.S. PATENT DOCUMENTS

2009/0135803 A1  5/2009 Luo et al.
2015/0142250 A1* 5/2015 Cavender-Bares .... A01C 15/00
                                                  111/200
(Continued)

FOREIGN PATENT DOCUMENTS

CN       102495634 A    6/2012
CN       102589524 A    7/2012
(Continued)

OTHER PUBLICATIONS

Supplementary European Search Report—EP19811964—Search Authority—Munich—dated Feb. 21, 2022.
(Continued)

*Primary Examiner* — Sharmin Chowdhury
*Assistant Examiner* — Angelie T Ngo
(74) *Attorney, Agent, or Firm* — Harrity & Harrity, LLP

(57) ABSTRACT

Various aspects and features related to wireless communication for unmanned vehicles or inspection routes are described. In an aspect of the disclosure, a method, a computer-readable medium, a system, and an apparatus are provided. A method of wireless communication includes identifying a plurality of checkpoints for an inspection route corresponding to a mobile communication device. The method includes identifying a task status for a current checkpoint of the plurality of checkpoints, the task status indicating a status of one or more tasks corresponding to the current checkpoint. The method includes sending a report to a communication device indicating the task status for the current checkpoint.

46 Claims, 10 Drawing Sheets

(51) Int. Cl.
*H04W 4/021* (2018.01)
*H04L 5/00* (2006.01)
*B64U 101/30* (2023.01)

(56) References Cited

U.S. PATENT DOCUMENTS

| | | |
|---|---|---|
| 2016/0084936 A1 | 3/2016 | Smith et al. |
| 2016/0116912 A1 | 4/2016 | Nehmadi et al. |
| 2018/0139774 A1* | 5/2018 | Ma .................. H04L 1/1896 |
| 2018/0225968 A1* | 8/2018 | Wang ................ G01C 21/30 |
| 2018/0324798 A1* | 11/2018 | Zhang ................ H04W 24/02 |
| 2019/0174149 A1* | 6/2019 | Zhang ............... H04N 21/2187 |

FOREIGN PATENT DOCUMENTS

| | | |
|---|---|---|
| CN | 105739531 A | 7/2016 |
| CN | 105955300 A | 9/2016 |
| CN | 106716973 A | 5/2017 |
| CN | 107067489 A | 8/2017 |
| CN | 107479571 A | 12/2017 |
| WO | WO-2016160593 A1 | 10/2016 |

OTHER PUBLICATIONS

International Search Report and Written Opinion—PCT/CN2018/089206—ISA/EPO—dated Feb. 19, 2019.
International Search Report and Written Opinion—PCT/CN2019/088248—ISA/EPO—dated Jul. 30, 2019.

* cited by examiner

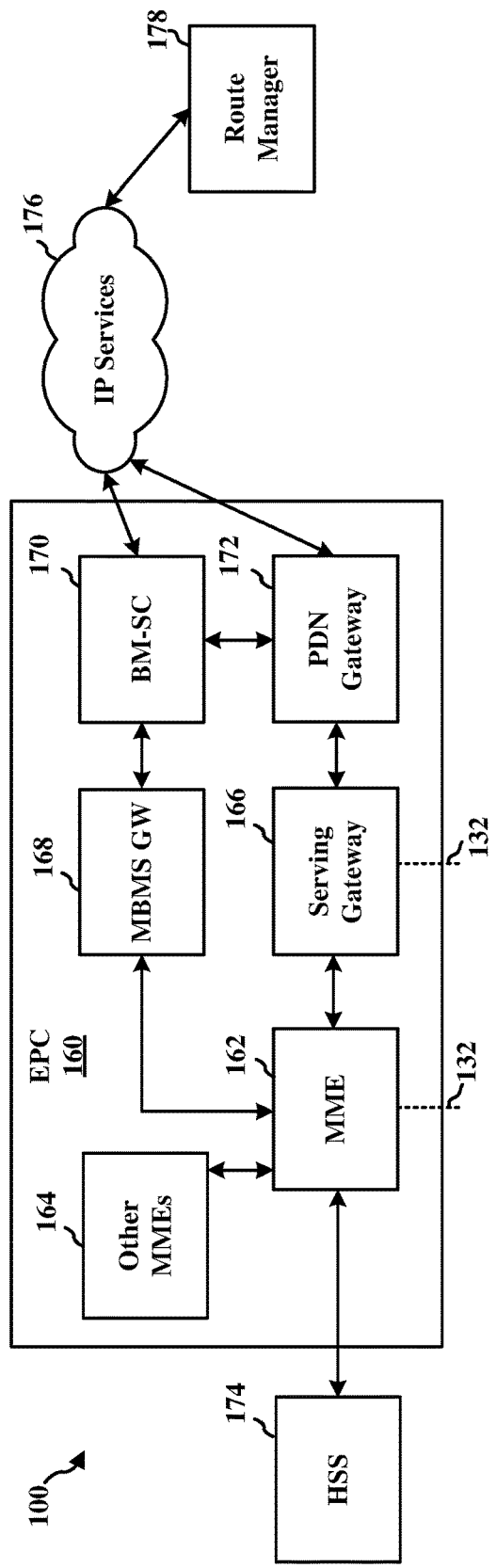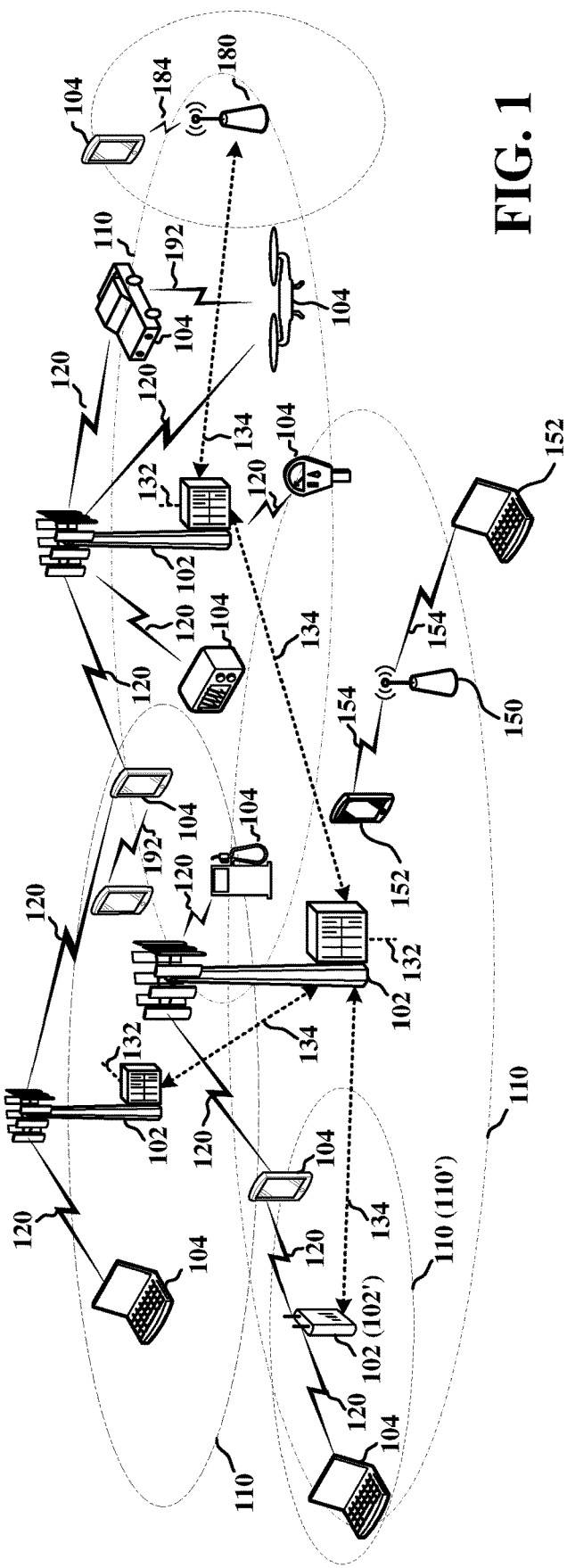
FIG. 1

INSPECTION ROUTE COMMUNICATIONS

CLAIM OF PRIORITY

This application is a continuation of PCT Application No. PCT/CN2019/088248, filed May 24, 2019, entitled "INSPECTION ROUTE COMMUNICATIONS," which claims priority to PCT Application No. PCT/CN2018/089206, filed on May 31, 2018, entitled "INSPECTION ROUTE COMMUNICATIONS," and assigned to the assignee hereof. The disclosure of the prior applications is considered part of and is incorporated by reference into this patent application in its entirety.

BACKGROUND

Technical Field

The present disclosure relates generally to wireless communications and more particularly relates wireless communications for vehicles on an inspection route.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

The availability of unmanned vehicles has increased in recent years, partly due to the availability of low power semi-conductor chips used in wireless communication systems. Wireless communications technologies in combination with unmanned vehicles opens up possibilities for monitoring or inspecting of geographic areas or routes.

BRIEF DESCRIPTION OF THE DRAWINGS

FIG. 1 is a diagram illustrating an example of a wireless communications system and an access network.

DETAILED DESCRIPTION

Figure 2:
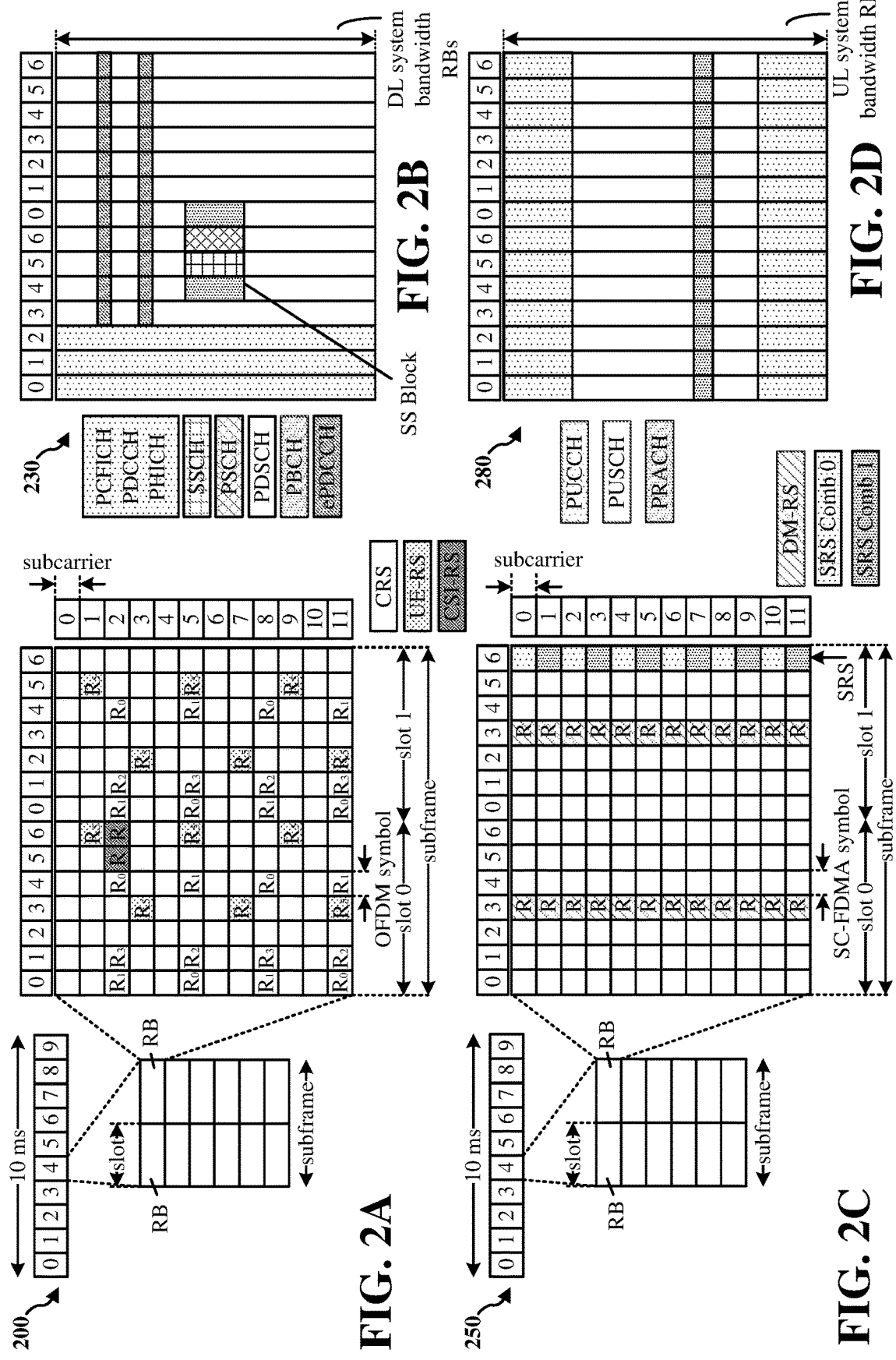
FIGS. 2A, 2B, 2C, and 2D are diagrams illustrating examples of a DL frame structure, DL channels within the DL frame structure, an UL frame structure, and UL channels within the UL frame structure, respectively.

Field inspections sometimes include inspection of geographically dispersed or geographically remote resources or structures. Such field inspections may include inspections of electrical grids, railways, forests, roadways, waterways, buildings, geographic features, bridges or other structures, or the like. Unmanned vehicles (i.e., drones) such as aerial, water based, and/or land based unmanned vehicles may allow for reduced costs and/or increased frequency for such inspections. For example, an unmanned aerial vehicle (UAV) may be configured with a predefined route with one or more checkpoints on the route. In some cases, an unmanned vehicle may include an autonomous vehicle that can operate, for at least some time, without human input. At each checkpoint, the unmanned vehicle may perform some task, such as capture and store pictures, videos, and/or audio. Other tasks may include communicating with a device at the location (e.g., wirelessly with a low power device) or obtaining data or measurements. The unmanned vehicle may return with the corresponding picture, audio, video, data, or measurements in storage which can be obtained when the unmanned vehicle returns to a starting or home location. In some cases, the unmanned vehicle may transmit the corresponding data wirelessly to a control center, such as via a cellular network.

Sometimes, the unmanned vehicles may miss one or more checkpoints or fail to perform tasks on the route. This can be due to adverse conditions (such as wind, fog, or precipitation) or an error. However, before the vehicles have returned and/or uploaded logs or data (e.g., pictures or other data) from an inspection, these problems or failures may be unknown. In some cases, it may be expected that the unmanned vehicles will transmit the data to a control center. However, the remote or rural locations may where a field inspection is performed may lack sufficient coverage or high data rate coverage to communicate large amounts of data. For example, this may be because dense or high data rate coverage in those areas is not cost efficient.

The present disclosure presents systems, methods, and devices for inspection route communications. At least some embodiments allow for efficient communications to indicate performance of tasks at checkpoints along a route and/or to receive instructions for performing a field inspection. According to one example embodiment, a method at a mobile communication device includes identifying a plurality of checkpoints for an inspection route corresponding to a mobile communication device. The method includes identifying a task status for a current checkpoint of the plurality of checkpoints. The task status indicates a status of one or more tasks corresponding to the current checkpoint. The method includes sending a report to a communication device indicating the task status for the current checkpoint.

According to one example embodiment, a method for communication with a mobile communication device includes receiving, at a base station, a report from a mobile communication device of an unmanned vehicle. The report indicates a task status of a current checkpoint of a plurality of checkpoints for an inspection route corresponding to the unmanned vehicle. The method includes identifying a next checkpoint for inspection based on the task status. The method includes sending a response to the mobile communication device indicating the next checkpoint.

The previous paragraphs and description is given by way of example and introduction only. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. It should be understood that some implementations may include other core networks than the EPC 160, such as a 5G core network. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to one or more restricted groups known as closed subscriber groups (CSGs). The communication links 120 between the base stations 102 and the UEs 104 may include uplink (UL) (also referred to as reverse link) transmissions from a UE 104 to a base station 102 and/or downlink (DL) (also referred to as forward link)

transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB) or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) and mmW spectrum are part of the radio frequencies in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base stations may include a gNB, Node B, evolved Node B (eNB), an access point, a base transceiver station, a radio base station, a radio transceiver, a transceiver function, a basic service set (BSS), an extended service set (ESS), a TRP, or the like. The base station 102 provides an access point or network node to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, factory machinery, an assembly line robot, a display, or any other device with wireless communication capability. Some of the UEs 104 may be referred to as IoT devices (e.g., parking meter, gas pump, toaster, vehicles, heart monitor, factory machinery, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communication system may include or be in communication with one or more IP accessible or Internet accessible servers or device. A route manager 178 may include a server or device that manages inspection routes performed or followed an a UE 104. For example, a UE 104 may include an unmanned vehicle which is capable of following an inspection route and performing one or more tasks. The UE 104 or vehicle may perform tasks such as capturing images, video, audio, communicating with a device to obtain a status of a device or receive sensor data, uploading data from or providing data to a low power device, or the like. A low power device may include an Internet-of-thing (IoT) device, battery powered device, or near-field communication device such as a radio frequency identifier (RFID).

The route manager 178 may store route details for one or more routes to be inspected by one or more UEs 104. The route manager 178 may provide route details to a UE 104 before or during an inspection route. The route manager 178 may provide route details to a base station 102 for routes that overlap a coverage area of the base station 102. In one embodiment, the route manager 178 may provide a base station 102 route details for checkpoints that fall within the base station's possible coverage area (there may be some overlap between base stations 102 so some checkpoints details may be available to multiple base stations 102). Although the route manager 178 is shown as an entity separate from a base station 102 or an access network 100, the route manager 178 may be included within one or more base stations 102 and/or in the access network 100 in at least some embodiments.

After performing or attempting to perform one or more tasks, a UE 104 may report a task status for that checkpoint to a base station 102. The report may include or indicate a checkpoint identifier (ID) for the current checkpoint as well as the task status. The task status may indicate the success or failure for each task at the checkpoint. The base station 102 may use a checkpoint ID is to confirm that the drone follows or is following the expected path and is not unknowingly missing checkpoints. The task status may be used to confirm that the drone successfully or unsuccessfully performed a task (such as captured photos or vehicle) for the checkpoint. Reporting tasks to a network or remote location may allow for improved or new operations while limiting a required data rate. For example, reporting tasks to a network may allow for coordination between a plurality of drones or between a remote device and a plurality of drones. Harsh weather, drone failure, or other problems may be mitigated by instructing another drone to perform a task or portion of a route when helpful. As another example, real-time or near real-time understanding of the progress of an inspection may allow for improved control in selecting which tasks to perform and/or may improve identification of a drones location if a drone fails or crashes.

In one embodiment, the UE 104 may scramble, and the base station 102 may descramble, the report using a non-orthogonal multiple access (NOMA) signature sequence. The NOMA signature sequence may allow multiple devices to transmit information on the same resources while still allowing the base station 102 to independently receive and decode that information, and attribute the transmission to a correct UE 104. The signature sequence may be assigned by the base station 102 or may be randomly selected by the UE 103. The base station 102, upon receiving a signal including the report, may attempt to descramble the report using different signature sequences. Based on the signature sequence that successfully decodes the report, the base station 102 may identify an identify of the UE 104.

The base station 102 may forward the report to the route manager 178 for a decision. For example, the route manager 178 may determine what the next checkpoint should be for the UE 104. For example, if the UE 104 mistakenly skipped a checkpoint, or a transmission for a checkpoint was not received, the route manager 178 may instruct the UE 104, via the base station 102, to return to the skipped checkpoint. Similarly, if the UE 104 has unsuccessfully attempted to perform a task at the current checkpoint, the route manager 178 may instruct the UE 104 to reattempt the tasks for the current checkpoint. The route manager 178 may make the decision based on various factors such as how many attempts the UE 104 has made to perform a task, a number of reports received for the checkpoint, how long the inspection route is taking, an importance level of the task, or other details.

A UE 104 may use grant-fee or grant-based resource selection for selecting resources for reporting a task status. For grant-free selection, the UE 104 may randomly select the resource such as one or more of time, frequency, signature sequences, spatial information, and the like for transmitting the task status report. For grant-based selection, the UE 104 may request a one-time or semi-persistent resource allocation and receive a message from the base station 102 allocating the resource.

FIG. 2A is a diagram 200 illustrating an example of a DL frame structure. Although the illustrated example DL frame structure closely resembles frame structure for 3GPP 4G specifications, one of skill in the art will understand that this is given by way of illustration only. Other frame structures, such as a corresponding frame structure for 3GPP 5G or other implementations or standards are encompassed by the present disclosure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. These structures are given by way of illustration only as the structure may vary between versions and technologies. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
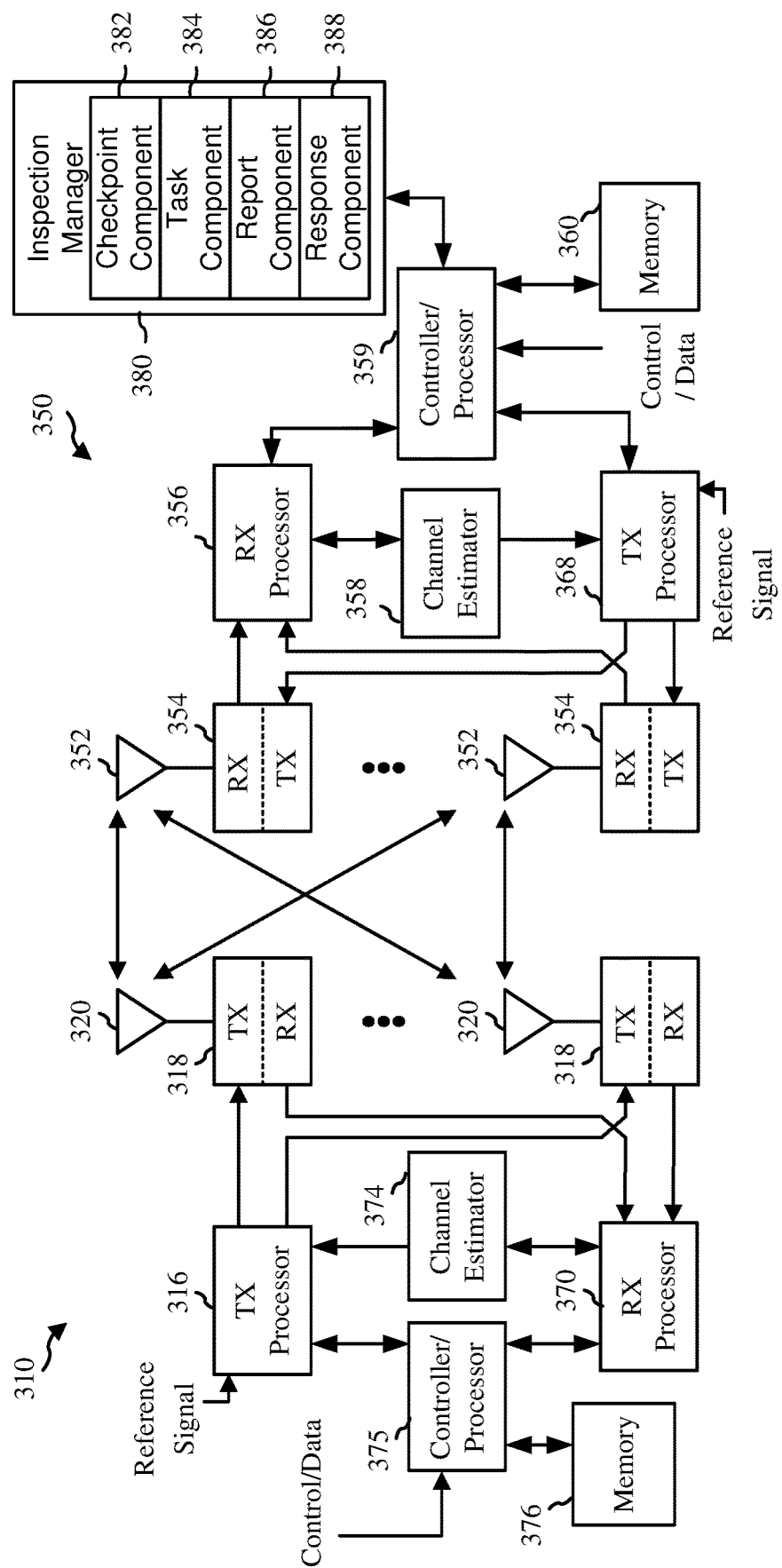
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

The inspection manager 380 may manage navigation and reporting of checkpoints of an inspection route. The inspection manager 380 may include a checkpoint component 382, task component 384, a report component 386, and response component 388. The inspection manager 380 may perform one or more mobile communication device operations such as those discussed herein. In one embodiment, the checkpoint component 382 performs the operations disclosed and discussed in relation to identifying 1202 a plurality of checkpoints of method 1200 of FIG. 12. In one embodiment, the task component 384 performs the operations disclosed and discussed in relation to identifying 1204 a task status of method 1200 of FIG. 12. In one embodiment, the report component 386 performs the operations disclosed and discussed in relation to sending 1206 a report to a communication device and sending 1212 a second report of method 1200 of FIG. 12. In one embodiment, the response component 388 performs the operations disclosed and discussed in relation to receiving 1210 a response from the communication device of method 1200 of FIG. 12. Each component may be at least partially implemented as circuitry and/or may be at least partially implemented as code, such as code stored in memory 360.

Figure 4:
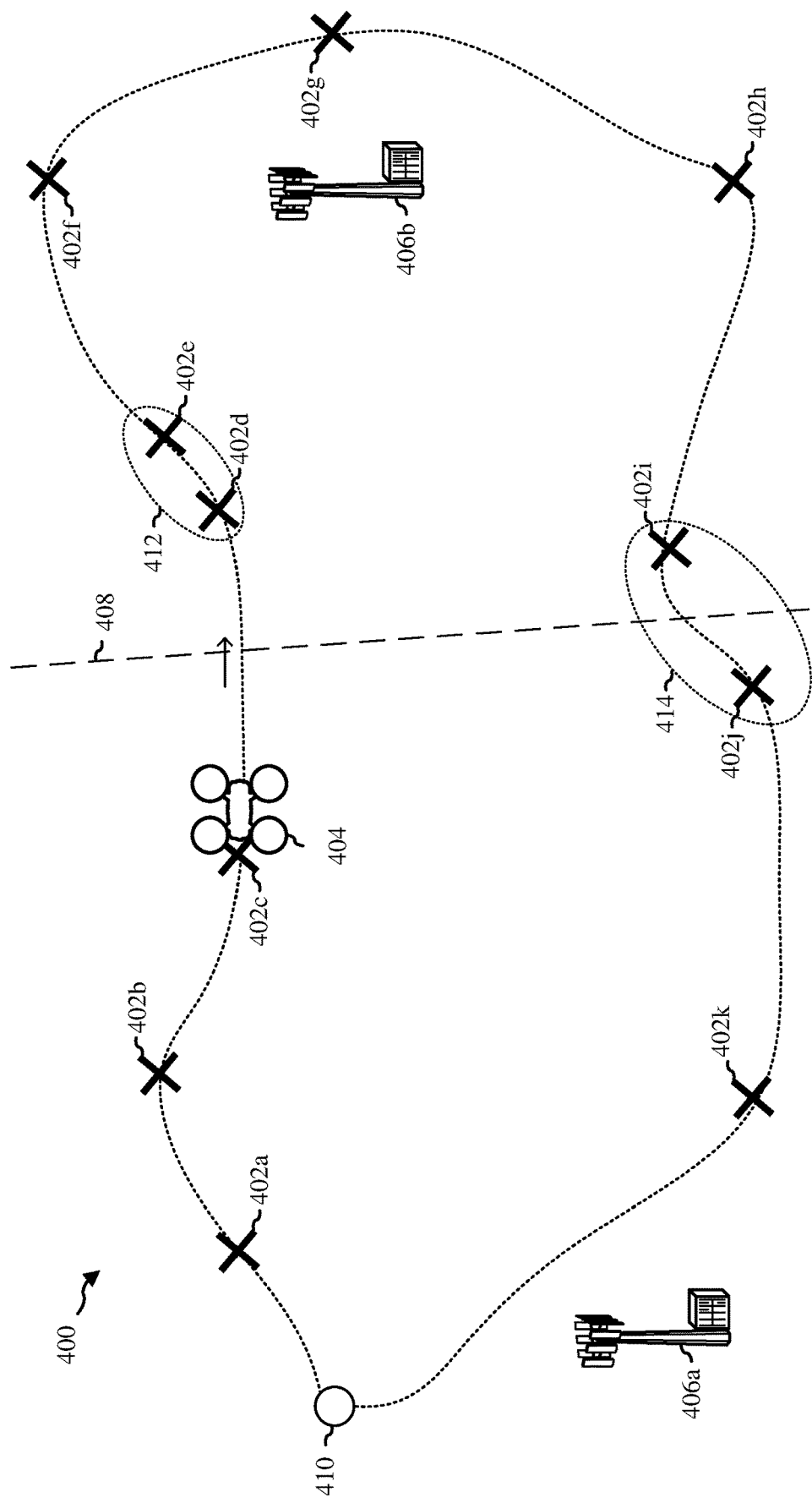
FIG. 4 is a diagram illustrating an example inspection route with a plurality of checkpoints.

FIG. 4 is a diagram illustrating an inspection route 400 with a plurality of inspection points 402a, 402b, 402c, 402d, 402e, 402f, 402g, 402h, 402i, 402j, and 402k (collectively checkpoints 402). The inspection route 400 may be spread across a geographic region and a UAV 404 may travel a path according to an order of the checkpoints 402. Line 408 indicates a coverage boundary between base station 406a and 406b (collectively base stations 406). The UAV 404 may include a UE 104 capable of wireless communication with the base stations 406a and 406b. As illustrated some of the checkpoints 402 are within a coverage area corresponding to base station 406a while other checkpoints 402 are within a coverage area corresponding to base station 406b. As will be understood, the inspection route 400 is illustrative only as a greater number or lesser number of checkpoints may be included.

A UAV 404 may start at a starting location 410 and proceed, based on an order, to each checkpoint 402 and attempt to perform tasks at each checkpoint. Upon completion of the inspection route 400, the UAV 404 may return to the starting location 410 or to another location.

Before embarking on the inspection route, the UAV 404 may be provided (e.g., via download) route details including details for the one or more checkpoints. The route details may include an ordered list of checkpoints. Each checkpoint may have a corresponding checkpoint ID, a set of tasks, an index number indicating its relative order in the inspection route, geographic location information, and/or other information. For example, the checkpoints may be listed, with other details, in an ordered list. As another example, each checkpoint may have a corresponding order index (e.g., 1 through N when there are N checkpoints). In one embodiment, multiple checkpoints may share a common checkpoint ID to reduce a number of bits needed to communicate the checkpoint ID. For example checkpoint group 412 includes checkpoints 402d and 402e which share a common checkpoint ID and checkpoint group 414 includes 402i and 402j which share a common checkpoint ID. In one embodiment, checkpoints which share a checkpoint ID may be identified uniquely by the UAV 404 based on a checkpoint index in a list of checkpoints, geolocation, one or more corresponding tasks, or the like, even if this information is not indicated in a report. The route details may be stored locally in the UAV 404 as network coverage may be poor at some location along the inspection route 400.

In one embodiment, in response to arriving at a checkpoint 402 on the inspection route 400 the UAV 404 attempts to perform one or more tasks associated with the checkpoint 402. Some tasks may be performed successfully while other's may not be performed successfully. By way of example, the UAV 404 may encounter difficult weather conditions that make it difficult to get near enough to a checkpoint 402 to perform a task or that the weather conditions do not allow for sufficient visibility for a task. Further examples include that a device or structure at the checkpoint 402 is not found or is damaged, or that communication could not be established with a communication device at the checkpoint 402. The UAV 404 may determine that a task is unsuccessful if it is not able to perform the task after a predetermined time of arriving at or near the geographic location of the checkpoint 402. The task may be deemed successful if the UAV 404 is able to perform the task, such as by capturing images, videos, audio, or completing a communication session with a device at the checkpoint.

In one embodiment, the UAV 404 may determine the success of a task based on whether it was achieved. For example, the UAV 404 may determine that a imaging task is successful if it has obtained videos or images at the checkpoint. A communication task may be determined successfully if a communication session successfully began and successfully terminated after receiving any data corresponding to the task. In these cases, the task may simply be successful with little or no validation of the data or details obtain. In some embodiments, some validation of the data obtained during a task may be performed by the UAV 404. For example, the UAV 404 may determine whether an image or video has an expected amount of contrast, lighting, or even expected structures. Validation on the obtained images, audio, video, or other data may provide additional real time understanding of the inspection process even if very low data rates are available. For example, if a task includes validation of some data, a reporting of the success of that task may indicate to a remote device (such as the route manager 178 or a base station) that at least a threshold quality of image, video, audio, or data has been obtained at the checkpoint.

Upon attempting to perform the tasks for the checkpoint, the UAV 404 may report the task status for that checkpoint 402. As discussed above, because some routes may include checkpoints in remote location and/or with poor wireless coverage, it may be helpful if the UAV 404 can report the status over a low data rate connection. Thus, status reports that require only a relatively small number of bits, when compared to the actual data gathered at a checkpoint, may be advantageous.

In one embodiment, the UAV 404 may transmit a report to a base station 406 that includes the task status. The task status may include one or more bits that indicate the success or failure for each task. For example, if there were three tasks at a specific checkpoint, the report for that checkpoint may include a three bit task status where each bit indicates the success or failure of each associated task. The report may also include a checkpoint identifier ID. The task status and/or checkpoint ID may be included as bits in the report or may be used to scramble the report or otherwise be indicated in the report. The report may be scrambled with a NOMA signature sequence to allow for non-orthogonal transmission by multiple devices on the same resources.

A base station 406 may receive the report and descramble the report using one of a plurality of available signature sequences. Based on the signature sequence that successfully descrambles the report, the base station 406 may be able to determine an identity of the UAV 404, a corresponding inspection route traveled by the UAV 404, and determine one or more details in the report. According to one embodiment, the base station 406 may store or retrieve route details for the inspection route 400 from a remote server or location. In response to the report, the base station 406 sends a response indicating a next checkpoint. The next checkpoint may be indicated by a checkpoint ID, an index of the next checkpoint, or the like. The response may indicate whether the UAV 404 should reattempt one or more tasks, return to a previous checkpoint, and/or skip forward to a later checkpoint. The base station 406 may identify the next checkpoint based on the task status for the checkpoint indicated in the report, the inspection route details, and/or information indicated by a remote device, such as a route manager 178. In one embodiment, a selection of the next checkpoint is performed locally in a local route manager 178 or remotely in a remote route manager 178.

Based on the reports of the task status for each checkpoint, a base station 406 or network accessible device may be able to track progress and status of the UAV 404 as it progresses along the inspection route 400. Furthermore, challenges and problems along the inspection route may be quickly identified or may be tracked over time.

In the state shown in FIG. 4, the UAV 404 is located at checkpoint 402c. The UAV 404 may have attempted one or more tasks. The UAV 404 may send a report to the base station 406a indicating at task status for the one or more tasks and a checkpoint ID corresponding to checkpoint 404. After transmitting, the UAV 404 may proceed toward a next checkpoint, in this case checkpoint 402d. The UAV 404 may proceed without waiting for a response or may wait a predetermined amount of time for a response from the base station 406a. If a response is received, the UAV 404 may proceed to a checkpoint indicated by the response or remain at the current checkpoint 402c and reattempt to perform any failed tasks.

If the UAV 404 proceeds to checkpoint 402d, the UAV 404 will cross a coverage boundary (indicated by line 408). Upon arrival at checkpoint 402d, the UAV 404 may determine that it is in a new coverage area and request or randomly select resources for task status reporting to the base station 406b. After attempting tasks at checkpoint 402d, the UAV 404 reports a task status for checkpoint 402d to base station 406b. The base station 406b may send a response indicating the next checkpoint for the UAV 404. The base station may indicate the next checkpoint by including a checkpoint ID or index for the checkpoint from the route details. In the case that a response was not received for checkpoint 402c, the base station 406b may indicate checkpoint 402c in a response. The UAV 404 may check its storage to see if it has already performed any tasks for checkpoint 402c and has received a response to a corresponding report. If it has attempted those tasks and sent a report without receiving a response, the UAV 404 may send a report for checkpoint 402c to the base station 406b before proceeding to checkpoint 402c. Based on the report for checkpoint 402c, the base station 406b may identify and send a new response. For example, the new response may indicate checkpoint 402e as the next checkpoint. If the UAV 404 had not resent the report for 402c, the UAV 404 may have wasted time and energy returning to checkpoint 402c and reattempting one or more tasks.

The UAV 404 may move to and attempt tasks at each checkpoint until it is finished with the route 404 and/or it receives a message to return to the starting location 410 or other end location. Although the UAV 404 may proceed in a general forward direction of travel based on an order of the checkpoints 402, the UAV 404 may return to or visit checkpoints out of order based on responses received from or via the base stations 406.

Figure 5:
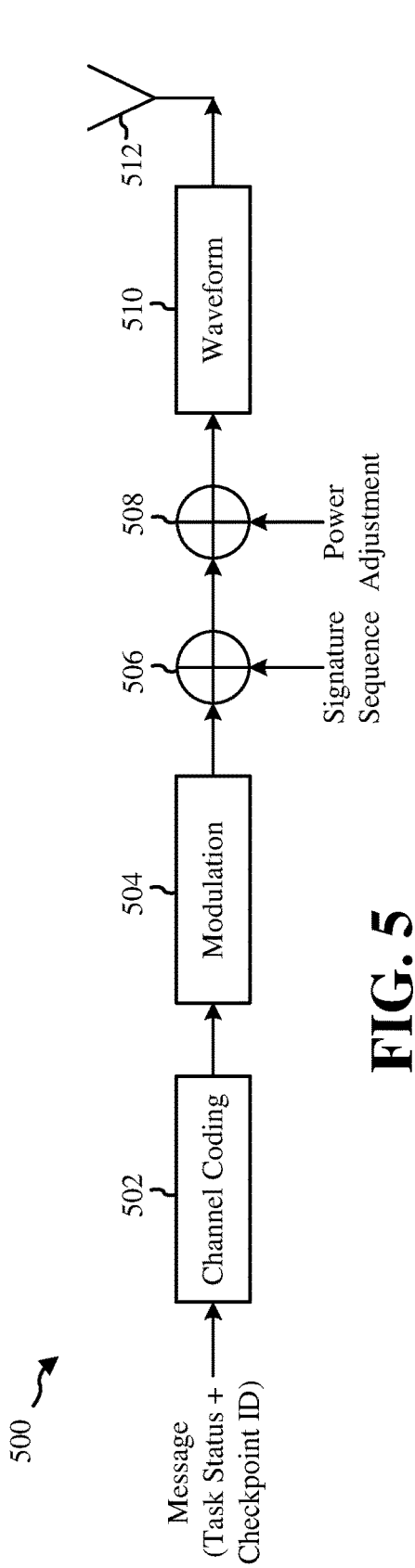
FIG. 5 is a diagram illustrating an example process for generating and transmitting a report of a task status.

FIG. 5 is a block diagram illustrating an example process 500 of generating and transmitting a report of a task status. The process 500 may be performed by a UE, such as a UE 104 of FIG. 1, UE 350 of FIG. 3, or UAV 404 of FIG. 4.

A message including bits or information indicating a task status and a checkpoint ID is generated. Channel coding 502 and modulation 504 is performed on the message. The coded and modulated message is scrambled 506 with a signature sequence, such as by performing an exclusive-OR (XOR) the signature sequence with the message or adding the signature sequence to the message. The signature sequence may be a NOMA sequence randomly selected by the UE or allocated by a base station. Example signature sequences may include orthogonal and/or spreading codes to allow two or more devices to transmit in the uplink using the same time and frequency resources. One example of a NOMA sequences includes a Walsh. NOMA, such as resource spread multiple access (RSMA) may be used to natively support a large link budget. The scrambled message is power adjusted 508, applied to a waveform 510, and transmitted via one or more antenna 512. The scrambled message may be power adjusted 508, for example, by multiplying by a weighting factor in the analog domain By way of example, for a specific checkpoint, a task status may include two bits, one bit each for two tasks associated with the checkpoint. The two tasks may include capturing a photo and capturing a video. The two bits of the task status may take the following possible values: 00, both tasks incomplete; 01, video not successfully captured, photo successfully captured; 10, video successfully captured, photo not successfully captured; or 11, both video and photo successfully captured. Thus, the message may be as small as two bits plus the number of bits (or a waveform) needed to communicate the checkpoint ID. A greater or smaller number of bits may be selected based on the number of tasks associated with a checkpoint.

Figure 6:
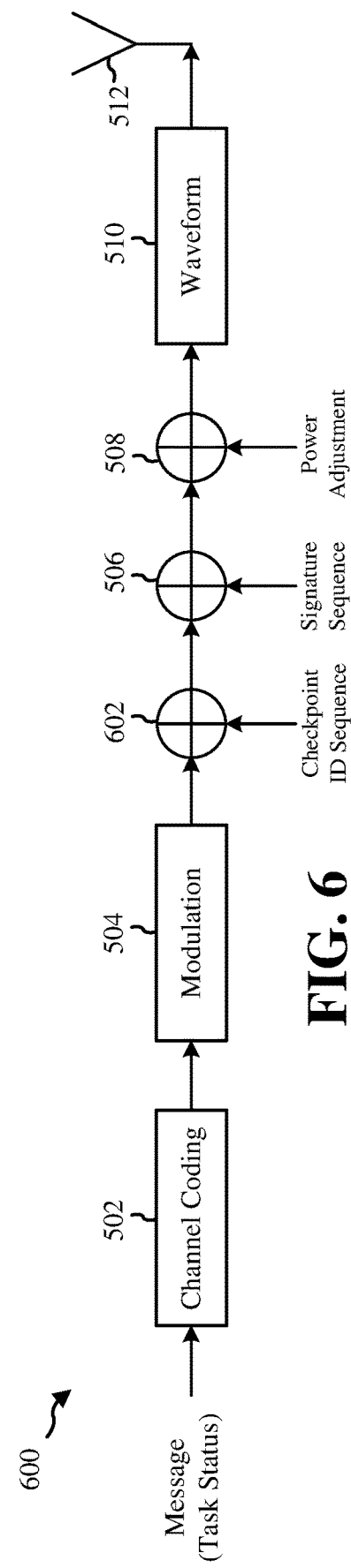
FIG. 6 is a diagram illustrating another example process for generating and transmitting a report of a task status.

FIG. 6 is a block diagram illustrating another example process 600 of generating and transmitting a report of a task status. The process 600 may be performed by a UE, such as a UE 104 of FIG. 1, UE 350 of FIG. 3, or UAV 404 of FIG. 4.

A message including bits or information indicating a task status is generated. Channel coding 502 and modulation 504 is performed on the message. The coded and modulated message is scrambled 602 with a checkpoint ID 602 and scrambled 506 with a signature sequence, such as by XOR operation or adding the checkpoint ID and/or signature sequence to the message. The signature sequence may be a NOMA sequence randomly selected by the UE or allocated by a base station. The scrambled message is power adjusted 508, applied to a waveform 510, and transmitted via one or more antenna 512. In one embodiment, an order of scrambling using the checkpoint ID and signature sequence may be switched. The checkpoint IDs may include sequential numbers (e.g., an N length bit number from 0 to N) or may include orthogonal or quasi-orthogonal codes to improve detection of the checkpoint ID upon descrambling/decoding the message.

In this example, if a two bit task status is transmitted, the message may be as short as two bits. The checkpoint ID may be obtained by descrambling using one or more signature sequences and/or checkpoint IDs to identify the correct checkpoint ID and signature sequence. In one embodiment, several checkpoints can share a single ID which will help to reduce the overhead.

Although FIGS. 5 and 6 are discussed in relation to transmissions from a UE to a base station, a base station may also perform the processes 500 or 600 to transmit information to a UE. For example, the base station may send a next checkpoint ID in a response to a report with the report scrambled by a signatures sequence corresponding to the UE and/or scrambled by the next checkpoint ID. The base station or UE may receive corresponding transmissions and attempt to descramble based on one or more signature sequences. For example, the base station may attempt to descramble using a plurality of sequences from a pool of sequences. As another example, a UE may only attempt to descramble using its own signature sequence.

Figure 7:
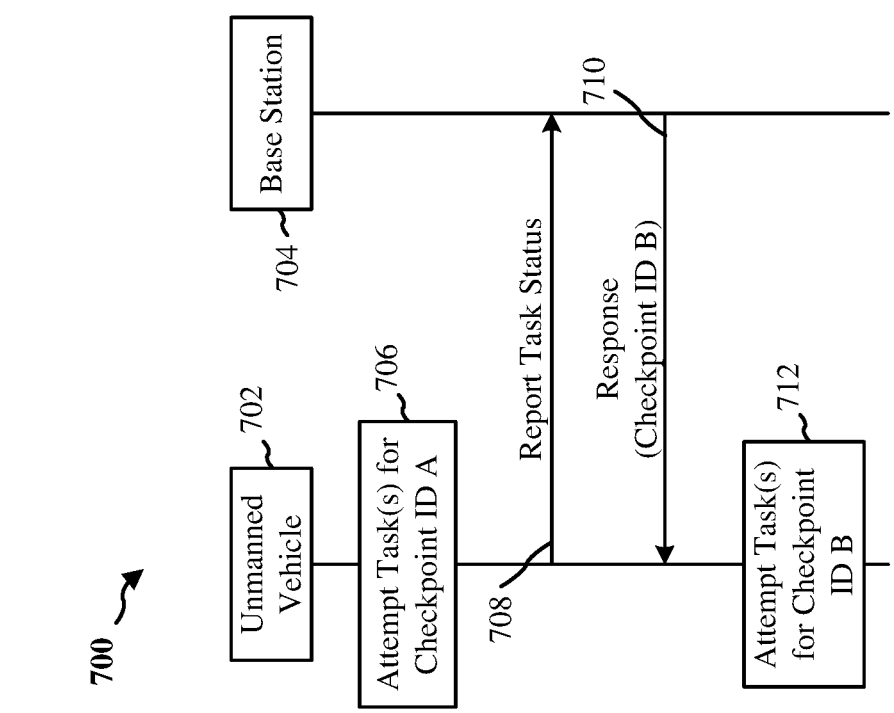
FIG. 7 is a call flow diagram illustrating an example method for reporting a task status for a checkpoint.

Turning to FIGS. 7, 8, 9, and 10, call flows depicting task status reports and responses are illustrated. The call flows illustrate communications and operations that may take place in different scenarios according to a common embodiment or in different embodiments. FIG. 7 is a call flow diagram illustrating an example method 700 of reporting a status. The method 700 may be performed by an unmanned vehicle 702 which may include a UE 104 of FIG. 1, UE 350 of FIG. 3, or UAV 404 of FIG. 4 and a base station 704 which may include a base station 102 of FIG. 1, a base station 310 of FIG. 3, or a base station 406 of FIG. 4. The method 700 may be combined with any other aspects or teaching of the other figures or embodiments discussed herein.

At 706, the unmanned vehicle 702 attempts one or more tasks for a checkpoint ID A. Checkpoint ID A may include a first checkpoint ID. At 708, the unmanned vehicle 702 reports and the base station 704 receives a task status. At 710, the base station 704 responds and the unmanned vehicle 702 receives the response. The response includes a new checkpoint, checkpoint ID B. Checkpoint ID B may include a checkpoint ID previous to, the same as, or later than checkpoint ID A. Based on the response at 710, the unmanned vehicle attempts tasks for checkpoint ID B at 712. If checkpoint ID B is different than checkpoint ID A, the unmanned vehicle may move to a geographic location corresponding to checkpoint ID B to attempt the tasks. The unmanned vehicle 702 may report the task status for checkpoint ID B after attempting the tasks at 712.

Figure 8:
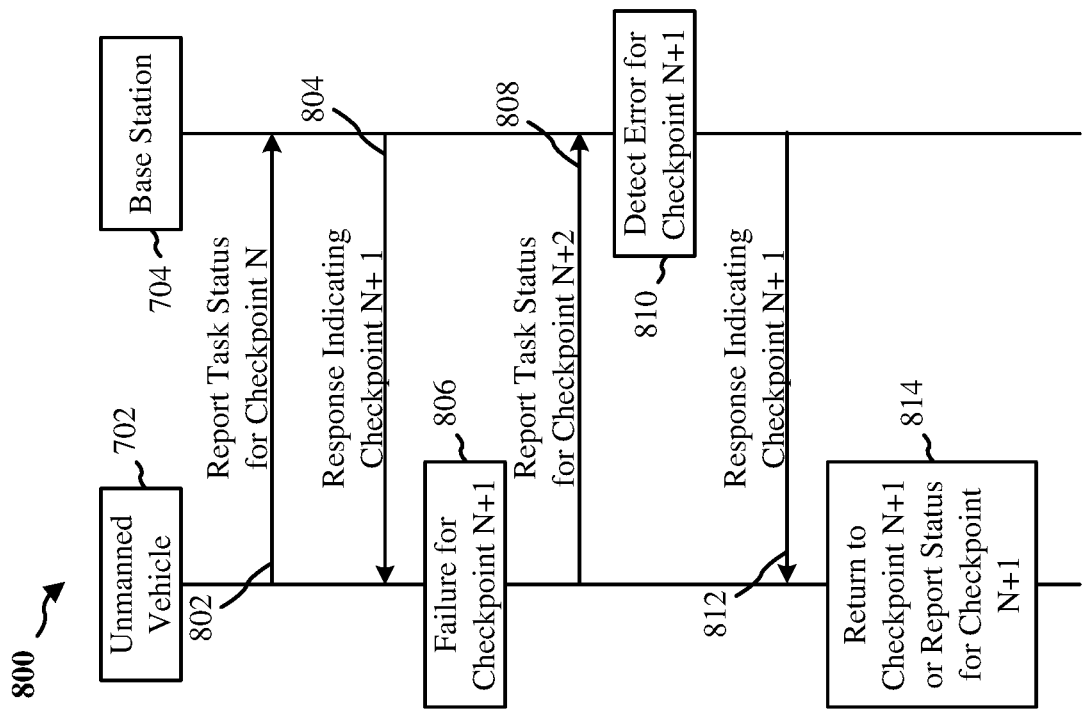
FIG. 8 is a call flow diagram illustrating another example method for reporting a task status for a checkpoint.

FIG. 8 is a call flow diagram illustrating an example method 800 for reporting a status. The method 800 may be performed by an unmanned vehicle 702 which may include a UE 104 of FIG. 1, UE 350 of FIG. 3, or UAV 404 of FIG. 4 and a base station 704 which may include a base station 102 of FIG. 1, a base station 310 of FIG. 3, or a base station 406 of FIG. 4. The method 800 may be combined with any other aspects or teaching of the other figures or embodiments discussed herein.

At 802, the unmanned vehicle 702 sends and the base station 704 receives a report for the task status for checkpoint N. At 804, the base station 704 sends a response indicating checkpoint N+1. Checkpoint N+1 may be indicated via an index or checkpoint ID corresponding to checkpoint N+1 in the response. At 806, some failure for checkpoint N+1 occurs. The failure may include that the unmanned vehicle 702 skips checkpoint N+1, that the unmanned vehicle 702 attempts one or more tasks which are unsuccessful, and/or that the unmanned vehicle 702 reports a task status for checkpoint N+1 which is not received by the base station 704. The unmanned vehicle 702 proceeds to checkpoint N+2 and, at 808, the unmanned vehicle 702 sends and the base station 704 receives a report of a task status for checkpoint N+2.

Based on the report at 808, the base station 704 (or a remote route manager 178) detects an error for checkpoint N+1 at 810. The base station 704 (or route manager 178) may detect an error by identifying that one or more tasks were unsuccessful for checkpoint N+1 or that no report for checkpoint N+1 was received. At 812, the base station 704 sends and the unmanned vehicle 702 receives a response indicating checkpoint N+1. At 814, the unmanned vehicle 702 either returns to checkpoint N+1 to (re)attempt one or more tasks or reports a task status for checkpoint N+1. For example, the unmanned vehicle 702 may check whether a response was receive regarding a previous report for checkpoint N+1. If no response was received, the unmanned vehicle 702 may resend the task status for checkpoint N+1. If the unmanned vehicle 702 returns and (re)attempts tasks for checkpoint N+1, the unmanned vehicle 702 may send a report indicating a task status for checkpoint N+1.

Figure 9:
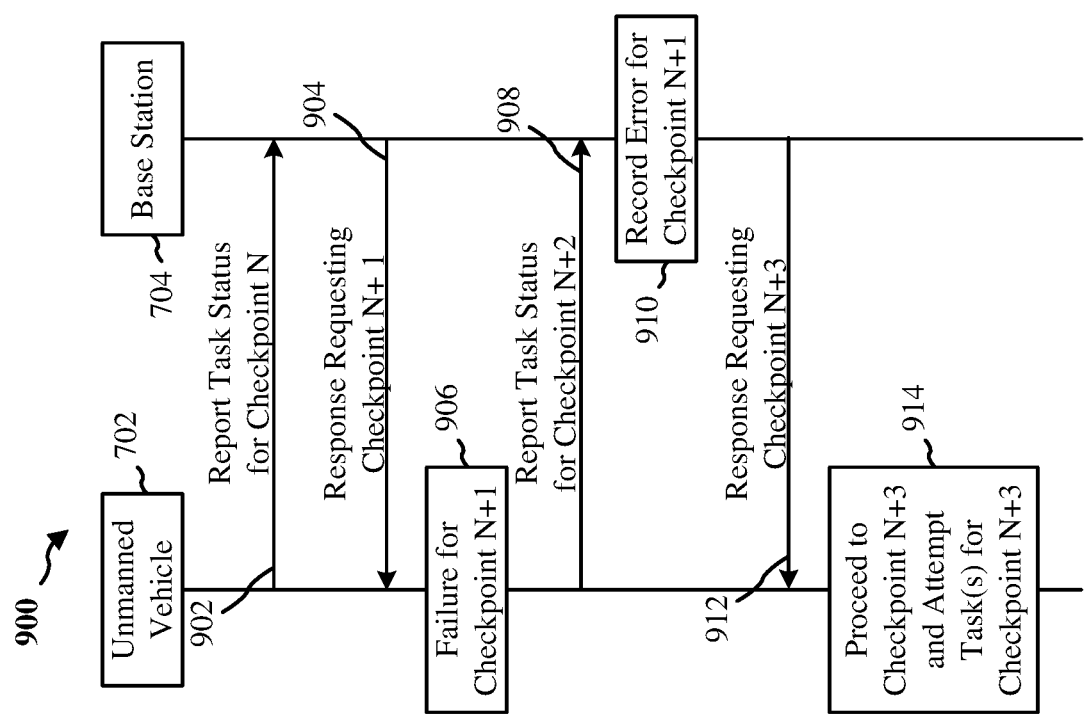
FIG. 9 is a call flow diagram illustrating another example method for reporting a task status for a checkpoint.

FIG. 9 is a call flow diagram illustrating an example method 900 for reporting a status. The method 900 may be performed by an unmanned vehicle 702 which may include a UE 104 of FIG. 1, UE 350 of FIG. 3, or UAV 404 of FIG. 4 and a base station 704 which may include a base station 102 of FIG. 1, a base station 310 of FIG. 3, or a base station 406 of FIG. 4. The method 900 may be combined with any other aspects or teaching of the other figures or embodiments discussed herein.

At 902, the unmanned vehicle 702 sends and the base station 704 receives a report for the task status for checkpoint N. At 904, the base station 704 sends a response indicating checkpoint N+1. Checkpoint N+1 may be indicated via an index or checkpoint ID corresponding to checkpoint N+1 in the response. At 906, some failure for checkpoint N+1 occurs. The failure may include that the unmanned vehicle 702 skips checkpoint N+1, that the unmanned vehicle 702 attempts one or more tasks which are unsuccessful, and/or that the unmanned vehicle 702 reports a task status for checkpoint N+1 which is not received by the base station 704. The unmanned vehicle 702 proceeds to checkpoint N+2 and, at 908, the unmanned vehicle 702 sends and the base station 704 receives a report of a task status for checkpoint N+2.

Based on the report at 908, the base station 704 (or a remote route manager 178) detects an error for checkpoint N+1. At 910, the base station 704 or route manager 178 records the error for checkpoint N+1. For example, the error may be recorded in a log. The base station 704 (or route manager 178) may detect an error by identifying that one or more tasks were unsuccessful for checkpoint N+1 or that no report for checkpoint N+1 was received. At 912, the base station 704 sends and the unmanned vehicle 702 receives a response indicating checkpoint N+3. At 914, the unmanned vehicle proceeds to checkpoint N+3 and attempts to perform tasks for checkpoint N+3. A task status for checkpoint N+3 may be reported.

Figure 10:
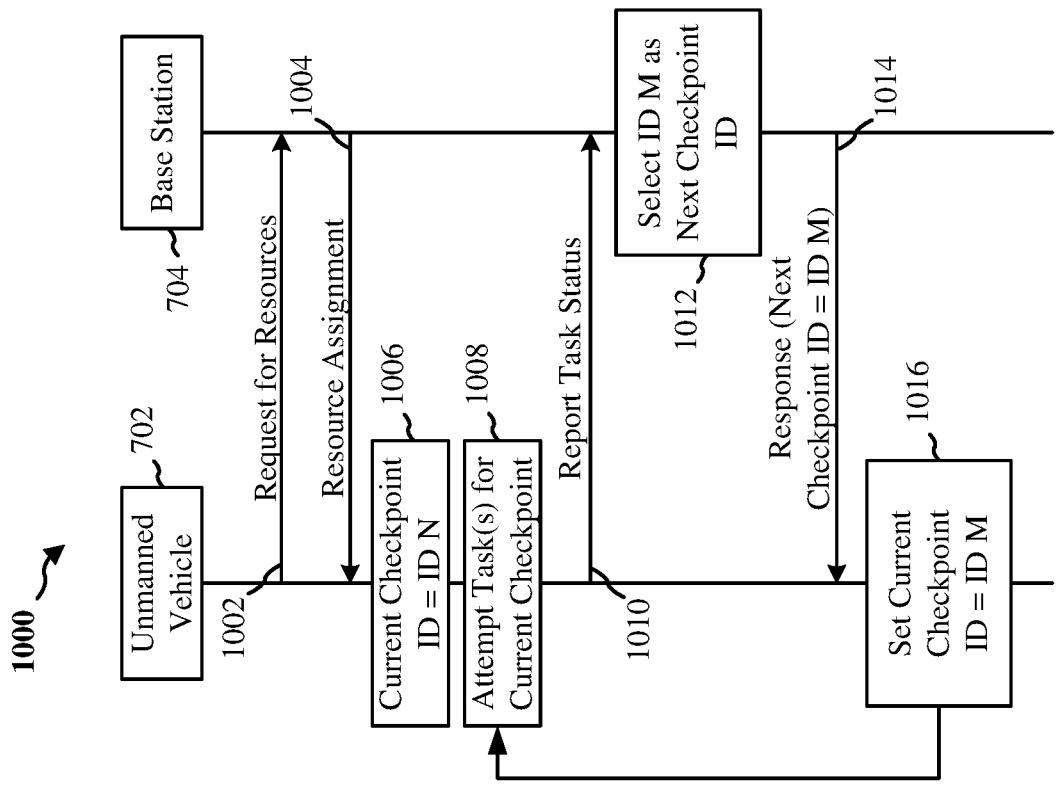
FIG. 10 is a call flow diagram illustrating yet another example method for reporting a task status for a checkpoint.

FIG. 10 is a call flow diagram illustrating an example method 1000 for reporting a status for checkpoints on an inspection route. The method 1000 may be performed by an unmanned vehicle 702 which may include a UE 104 of FIG. 1, UE 350 of FIG. 3, or UAV 404 of FIG. 4 and a base station 704 which may include a base station 102 of FIG. 1, a base station 310 of FIG. 3, or a base station 406 of FIG. 4. The method 1000 may be combined with any other aspects or teaching of the other figures or embodiments discussed herein.

At 1002, the unmanned vehicle 702 sends and the base station 704 receives a request for resources. The request for resources may be a request for time and frequency resources as well as a signature sequence. At 1004, the base station 704 sends and the unmanned vehicle 702 receives a resource assignment. The resource assignment may indicate time and frequency resources, spatial information, and a signature sequence to use when reporting task status for checkpoints on an inspection route. In one embodiment, the resource assignment may include a dynamic or a semi-persistent resource assignment.

At 1006, the unmanned vehicle 702 sets the current checkpoint ID to ID N. At 1008, the unmanned vehicle 702 attempts task for the checkpoint corresponding to the current checkpoint ID. The unmanned vehicle 702 may fly, drive, or otherwise move to a location of the current checkpoint in order to attempt the tasks. At 1010, the unmanned vehicle 702 sends and the base station 704 receives a report of the task status for the current checkpoint. At 1012, the base station 704 (or a route manager 178) selects value ID X as the next checkpoint ID. ID X may correspond to an earlier, a later, or the same checkpoint as ID N. The base station 702 or route manager 178 may select ID M based on whether it was skipped or whether one or more tasks were unsuccessful. At 1014, the base station 704 sends and the unmanned vehicle 702 receives a response indicating that the next checkpoint ID is ID M. At 1016, the unmanned vehicle 702 sets the current checkpoint ID to ID M and returns to 1008 to attempt (or reattempt) to perform tasks for the current checkpoint (now ID M).

Figure 11:
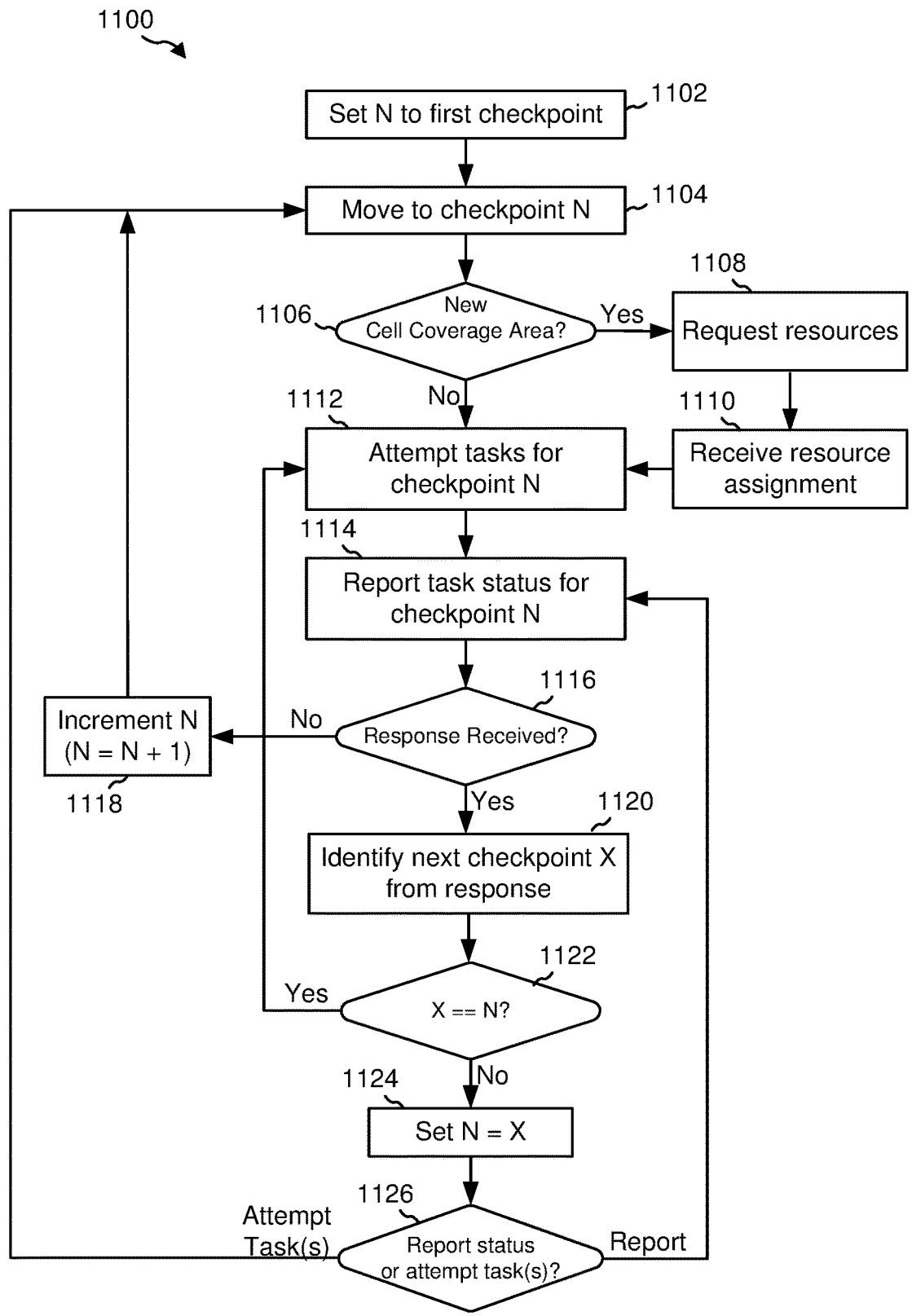
FIG. 11 is a flowchart of an example method of wireless communication for reporting task statuses for a plurality of checkpoints.

FIG. 11 is a schematic flow chart diagram illustrating an example method 1100 for reporting a status for checkpoints on an inspection route. The method 1100 may be performed by a UE such as an unmanned vehicle 702 of FIGS. 7-10, a UE 104 of FIG. 1, the UE 350 of FIG. 3, or the UAV 404 of FIG. 4. The method 1100 may be combined with any other aspects or teaching of the other figures or embodiments discussed herein.

At 1102, a UE sets N to a value indicating a first checkpoint, such as the very first checkpoint on a inspection route. N may be an index (e.g., it's order one the route) or a checkpoint ID. At 1104, the UE moves to checkpoint N, such as a geographic location corresponding to checkpoint N.

At 1106, the UE identifies whether the UE is in a new coverage area. If the UE is in a new coverage area (Yes at 1106), the UE requests resources for transmitting a report of a task status at 1108. At 1110 the UE receives a resource assignment from the base station. In some embodiments, the UE selects a signature sequence from a pool of available signature sequences. In some embodiments, the UE receives a grant for a specific signature sequence. If the UE is not in a new coverage area (No at 1106), the UE attempts one or more tasks corresponding to checkpoint N at 1112. The UE may log or determine a task status based on the success or failure of the attempts.

At 1114, the UE reports a task status for checkpoint N to a base station. For example, the UE may report the task status by generating and sending a message as discussed in relation to, and shown in, FIGS. 5 and 6 or elsewhere herein. At 1116, the UE determines whether a response to the report of task status has been received. For example, the UE may wait a predetermined amount of time for a response to the report send at 114. If no response is receive (No at 1116), the UE increments N to the next checkpoint at 1118 and proceeds to 1104 to continue the method 1100 from that point. For example, if N is the checkpoint index in the list of checkpoints, the UE may simply add 1 to N to get the index for the next checkpoint. If N is the checkpoint ID, the UE may set N to the checkpoint ID for the next checkpoint in the list.

If a response is received (Yes at 1116), the UE identifies, at 1120, a next checkpoint X based on the response. At 1122, the UE determines whether X is equal to N (e.g., whether checkpoint X is the same as checkpoint N). If X is equal to N (Yes at 1122), the UE attempts 1112 (or reattempts) to perform tasks corresponding to checkpoint N. The UE may only attempt to perform task that were not yet successful, in some embodiments. If X is not equal to N (checkpoint X is an earlier or later checkpoint than checkpoint N) (No at 1122), the UE sets N to X at 1124. At 1126, the UE determines whether it is to report a status check or (re)

attempt tasks for checkpoint N. For example, the response may indicate that the UE is report the task status, if available, or may indicate that the UE is proceed to reattempt the tasks. If the UE is to (re)attempt the tasks (Attempt Tasks at 1126), the UE moves to checkpoint N (which has been set to checkpoint X) at 1104 and performs the method 1100 from that point. If the UE is to report the task status (Report at 1126), the UE reports the task status at 1114 for checkpoint N (which has been set to checkpoint X) and performs the method 1100 from that point.

In one embodiment, a cloud server (such as a route manager 178) makes decisions about a next checkpoint. For example, the cloud server may maintain a whole list of checkpoint IDs for an inspection route in a right order and each base station may only maintain the checkpoint ID for checkpoints in its coverage. The cloud server may inform the base station how to respond based on a message from the cloud server, or the base station may forward a message from the cloud server. In one embodiment, a RAN entity (such as a base station) or a core network entity may select the next checkpoint.

Figure 12:
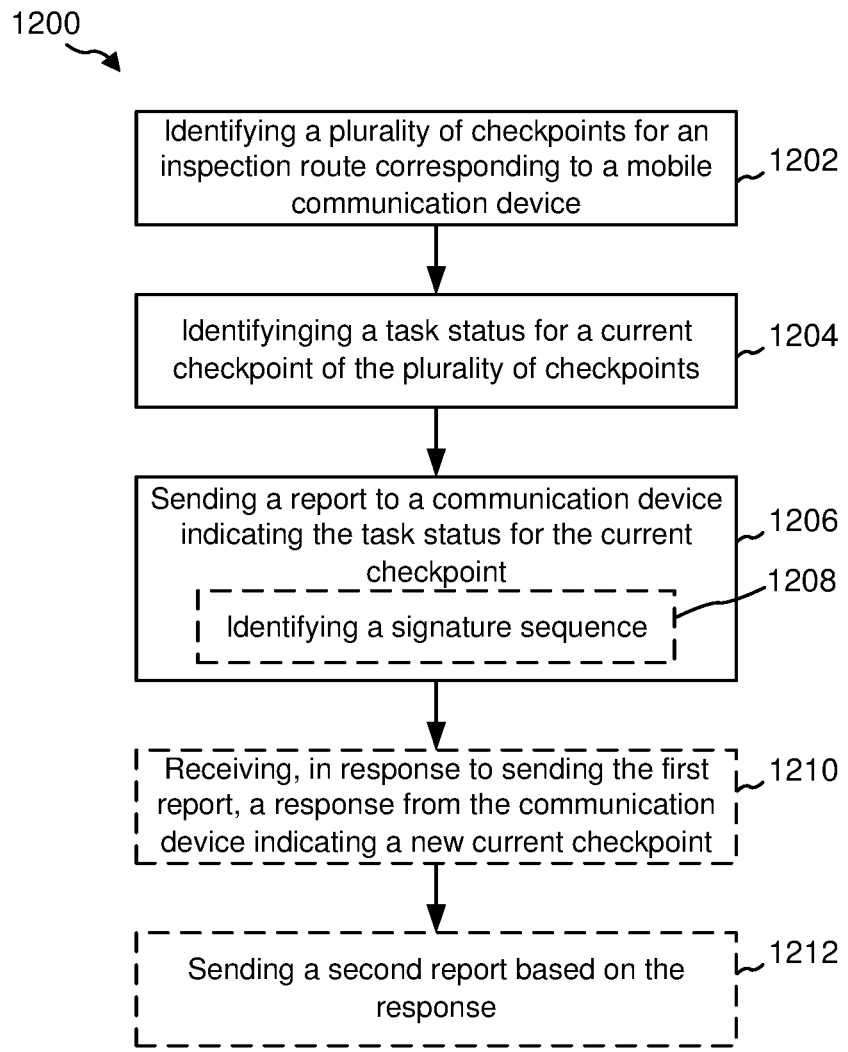
FIG. 12 is a flowchart of an example method of wireless communication for reporting task statuses for a plurality of checkpoints.

FIG. 12 is a flowchart 1200 illustrating a method 1200 of wireless communication. The method 1200 is discussed in relation to the UE 350 of FIG. 3 but may be performed by any mobile communication device discussed herein such as an unmanned vehicle 702 of FIGS. 7-10, a UE 104 of FIG. 1, or the UAV 404 of FIG. 4. Broken lines indicate optional processes or procedures of the method 1200. However, the method 1200 may be modified according to any other aspects or teaching disclosed herein without departing from the scope of the disclosure.

The a checkpoint component 382 identifies 1202 a plurality of checkpoints for an inspection route corresponding to a mobile communication device. In some embodiments, each checkpoint is associated with a geographic location along the inspection route. In some embodiments, the one or more tasks comprise one or more of: capturing an image of a region or structure; capturing a video of a region or structure; obtaining data or measurements; or communicating with a low power device. Each of the plurality checkpoints for the inspection route may be associated with a checkpoint identifier. The method 1200 may also include the checkpoint component 382 instructing an unmanned vehicle of the mobile communication device (e.g., a parent vehicle) to move to the current checkpoint or other checkpoint. The unmanned vehicle may include an unmanned aerial vehicle (UAV) or other unmanned vehicle.

The task component 384 identifies 1204 a task status for a current checkpoint of the plurality of checkpoints. The task status may indicate a status of one or more tasks corresponding to the current checkpoint. The method 1200 may also include the task component 384 identifying the current checkpoint and the one or more tasks corresponding to the checkpoint. The method 1200 may also include the task component 384 attempting to perform, or instructing a parent vehicle to perform, the one or more tasks corresponding to the current checkpoint. The task component 384 may identify 1204 the task status comprises identifying based on the attempting to perform the one or more tasks. The identifying 1204 the task status may include the task component 384 determining whether each of the one or more tasks corresponding to the current checkpoint has been successfully completed. Determining whether each of the one or more tasks corresponding to the current checkpoint has been successfully completed includes, in at least one embodiment, the task component 384 determining based on one or more of a timer or an ability to reach a corresponding geographic location.

The report component 386 sends 1206, or causes the mobile communication device to send, a report to a communication device, such as a base station, indicating the task status for the current checkpoint. In some embodiments, the report indicates a checkpoint identifier for the current checkpoint. The method 1200 may further include the report component 386 scrambling the report, or causing the mobile communication device to scramble the report, with the checkpoint identifier to indicate the checkpoint identifier. The task status may indicate whether the one or more tasks have been successfully completed.

The report component 386 may identify 1208 a signature sequence and sending 1206 the report indicating the task status for the current checkpoint may include scrambling using the signature sequence. The signature sequence may include a NOMA sequence from a pool of NOMA sequences. Identifying the signature sequence may include the report component 386 randomly selecting the signature sequence from a set of available signature sequences. Identifying the signature sequence may include the report component 386 receiving the signature sequence or an indication of the signature sequence from a base station. The method 1200 may also include the report component 386 identifying a resource for transmitting the report.

The response component 388 receives 1210, in response to sending the first report at 1206, a response from the communication device indicating a new current checkpoint. The current checkpoint may include a first checkpoint and the report may include a first report. The method 1200 may further include the report component 388 receiving, in response to sending the first report, a response from the communication device indicating a new current checkpoint. The new current checkpoint may include a second checkpoint previous or subsequent to the first checkpoint. The method 1200 may further include the report component 388 or the checkpoint component 382 causing an unmanned vehicle of the mobile communication device to move to a location of the second checkpoint. The new current checkpoint may include a second checkpoint previous or subsequent to the first checkpoint.

The report component 386 sends 1212 a second report based on the response. In some embodiments, the communication device includes a first base station and sending 1212 the second report includes the report component 386 sending the second report to a second base station. The sending 1212 the second report may include sending the second report to the same communication device. The method 1200 may include the task component 384 attempting, or causing or instructing the parent vehicle or parent mobile communication device, to perform one or more tasks corresponding to the second checkpoint and identifying a task status for the second checkpoint in response to attempting to perform the one or more tasks. The second report may indicate the task status for the second checkpoint.

In one embodiment, the method 1200 may include the task component 384 retrieving a task status for the second checkpoint stored in memory, wherein the sending the second report includes the report component 386 sending the task status for the second checkpoint. In some embodiments, the new current checkpoint includes the first checkpoint. The method 1200 may include the task component 384 attempting to perform a task of the one or more tasks corresponding to the first checkpoint that has not been successfully completed. The method 1200 may include the task component 384 identifying an updated task status for the first checkpoint in response to attempting to perform the task of the one or more tasks. The second report may indicate the updated task status for the current checkpoint. The response may indicate a checkpoint identifier for the new current checkpoint.

Figure 13:
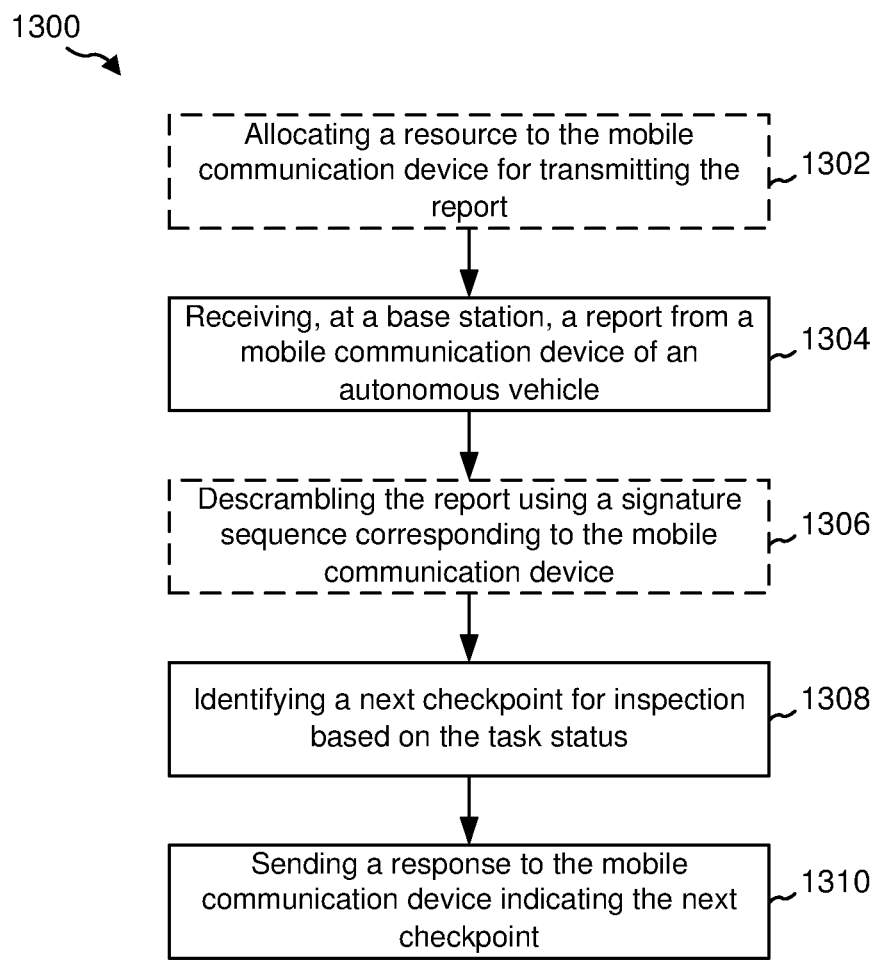
FIG. 13 is a flowchart of an example method of tracking inspection of one or more checkpoints

FIG. 13 is a flowchart 1300 illustrating a method 1300 for tracking inspection of one or more checkpoints. The method 1300 is discussed in relation to the base station 310 but may be performed by other base stations discussed herein such as a base station 102 of FIG. 1, a base station 406 of FIG. 4, or any base station in combination with a route manager 178. Broken lines indicate optional processes or procedures of the method 1300. However, the method 1300 may be modified according to any other aspects or teaching disclosed herein without departing from the scope of the disclosure. A base station may perform the method based on instructions stored in memory and/or based on circuits or processors in circuits or hardware of the base station.

The base station 310 allocates 1302 a resource to one or more mobile communication devices including a mobile communication device for transmitting a report. The base station 310 may allocate 1302 time, frequency, and/or spatial resources to a mobile communication device for reporting task statuses for checkpoints. For example, the base station 310 may allocate 1302 resources within a frame structure illustrated in FIGS. 2A, 2B 2C, and/or 2D. For example, the base station 310 may allocate 1302 one or more resource elements for the mobile communication device to use to report a task status. The base station 310 may also send a message indicating the signature sequence to be used by the mobile communication device. In some cases, the resources to be used may be allocated in advance of the inspection or may be allocated by a previous base station which may allow a mobile communication device to use the same set of resources for a larger portion or all of an inspection route.

The method 1300 may also include the base station 310 identifying the plurality of checkpoints for the inspection route corresponding to the unmanned vehicle. Identifying the plurality of checkpoints may include the base station 310 receiving the plurality of checkpoints from a remote server, such as a route manager 178, each checkpoint associated with a geographic location and a checkpoint identifier. Each checkpoint of the plurality of checkpoints may correspond to a different checkpoint identifier. In one embodiment, at least one checkpoint identifier corresponds to a group of checkpoints of the plurality of checkpoints. The plurality of checkpoints identified by the base station 310 for the inspection route may include a subset of all checkpoints for the inspection route. The plurality of checkpoints for the inspection route may include checkpoints within a geographic coverage of the base station 310.

The base station 310 receives 1304 a report from a mobile communication device of an unmanned vehicle, the report indicating a task status of a current checkpoint of the plurality of checkpoints for an inspection route corresponding to the unmanned vehicle. The base station 310 may descramble 1306 the report using a signature sequence corresponding to the mobile communication device. The signature sequence may include a NOMA sequence from a pool of available NOMA sequences. The base station 310 may attempt to descramble the report using a plurality of NOMA sequences from the pool of available NOMA sequences and may determine an identity of the mobile communication device based on a signature sequence that successfully descrambles the report.

The base station 310 identifies 1308 a next checkpoint for inspection based on the task status. Identifying 1308 the next checkpoint for inspection may include the base station 310 or the route manager 178 selecting the next checkpoint for inspection from the plurality of checkpoints. The base station 310 may identify 1308 the next checkpoint based on a communication from the route manager 178. The current checkpoint may include a first checkpoint and the next checkpoint may include a second checkpoint. The second checkpoint includes, in some embodiments, a checkpoint previous or subsequent to the first checkpoint on the inspection route. Selecting the second as the next checkpoint may include the base station 310 or the route manager 178 selecting based on one or more of whether a report has been received for the second checkpoint or whether at least one task of one or more tasks corresponding to the second checkpoint was not successfully completed. In some cases or embodiments, the current checkpoint includes a first checkpoint and the next checkpoint includes the first checkpoint. The base station 310 may select or identify the first checkpoint as the next checkpoint based on whether at least one task of one or more tasks corresponding to the first checkpoint was not successfully completed. The base station 310 may identify 1308 the next checkpoint for inspection based on the identity determined during descrambling 1306. The task status indicates a status of one or more tasks corresponding to the current checkpoint.

The base station 310 may send 1310 a response to the mobile communication device indicating the next checkpoint.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a mobile communication device, comprising:
   memory; and
   a processor, coupled to the memory, configured to cause the apparatus to:
      identify a plurality of checkpoints for an inspection route corresponding to the mobile communication device;
      identify a task status of a current checkpoint of the plurality of checkpoints, the task status indicating a status of one or more tasks corresponding to the current checkpoint; and
      send a report to a communication device indicating the task status of the current checkpoint, the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint.

2. The apparatus of claim 1, wherein the current checkpoint comprises a first checkpoint and the report comprises a first report, wherein the processor is further configured to cause the apparatus to:
   receive, in response to sending the first report, a response from the communication device indicating a new current checkpoint; and
   send a second report based on the response.

3. The apparatus of claim 2, wherein the communication device comprises a first network entity, wherein sending the second report comprises sending the second report to a second network entity.

4. The apparatus of claim 2, wherein sending the second report comprises sending the second report to the communication device.

5. The apparatus of claim 2, wherein the new current checkpoint comprises a second checkpoint previous or subsequent to the first checkpoint, wherein the processor is further configured to cause the apparatus to:
   cause an unmanned vehicle of the mobile communication device to move to a location of the second checkpoint;
   attempt to perform one or more tasks corresponding to the second checkpoint; and
   identify a task status for the second checkpoint in response to attempting to perform the one or more tasks;
   wherein the second report indicates the task status for the second checkpoint.

6. The apparatus of claim 2, wherein the new current checkpoint comprises a second checkpoint previous or subsequent to the first checkpoint, wherein the processor is further configured to cause the apparatus to:
   retrieve a task status for the second checkpoint stored in memory, wherein the sending the second report comprising sending the task status for the second checkpoint.

7. The apparatus of claim 2, wherein the new current checkpoint comprises the first checkpoint, wherein the processor is further configured to cause the apparatus to:
   attempt to perform a task of the one or more tasks corresponding to the first checkpoint that has not been successfully completed; and
   identify an updated task status for the first checkpoint in response to attempting to perform the task of the one or more tasks;
   wherein the second report indicates the updated task status for the current checkpoint.

8. The apparatus of claim 2, wherein the response indicates a checkpoint identifier for the new current checkpoint.

9. The apparatus of claim 1, wherein each of the plurality of checkpoints for the inspection route is associated with a checkpoint identifier.

10. The apparatus of claim 1, wherein the report indicates the checkpoint identifier for the current checkpoint.

11. The apparatus of claim 10, wherein the processor is further configured to cause the apparatus to:
    scramble the report with the checkpoint identifier to indicate the checkpoint identifier.

12. The apparatus of claim 1, wherein the task status indicates whether the one or more tasks have been successfully completed.

13. The apparatus of claim 1, wherein the processor is further configured to cause the apparatus to:
    identify the current checkpoint and the one or more tasks corresponding to the current checkpoint.

14. The apparatus of claim 1, wherein the processor is further configured to cause the apparatus to:
    instruct an unmanned vehicle of the mobile communication device to move to the current checkpoint.

15. The apparatus of claim 14, wherein the unmanned vehicle comprises an unmanned aerial vehicle (UAV).

16. The apparatus of claim 1, wherein the processor is further configured to cause the apparatus to:
    attempt to perform the one or more tasks corresponding to the current checkpoint, wherein identifying the task status comprises identifying based on the attempting to perform the one or more tasks.

17. The apparatus of claim 16, wherein identifying the task status comprises determining whether each of the one or more tasks corresponding to the current checkpoint has been successfully completed.

18. The apparatus of claim 17, wherein determining whether each of the one or more tasks corresponding to the current checkpoint has been successfully completed comprises determining based on one or more of:
    a timer; or
    an ability to reach a corresponding geographic location.

19. The apparatus of claim 1, wherein the processor is further configured to cause the apparatus to:
    identify a signature sequence, wherein sending the report indicating the task status for the current checkpoint comprises scrambling using the signature sequence.

20. The apparatus of claim 19, wherein the signature sequence comprises a non-orthogonal multiple access (NOMA) sequence.

21. The apparatus of claim 19, wherein identifying the signature sequence comprises randomly selecting the signature sequence from a set of available signature sequences.

22. The apparatus of claim 19, wherein identifying the signature sequence comprises receiving the signature sequence or an indication of the signature sequence from a network entity.

23. The apparatus of claim 1, wherein the processor is further configured to cause the apparatus to:
identify a resource for transmitting the report.

24. The apparatus of claim 1, wherein each checkpoint is associated with a geographic location along the inspection route.

25. The apparatus of claim 1, wherein the one or more tasks comprise one or more of:
capturing an image of a region or structure;
capturing a video of a region or structure;
obtaining data or measurements; or
communicating with a low power device.

26. A method for a mobile communication device, comprising:
identifying a plurality of checkpoints for an inspection route corresponding to the mobile communication device;
identifying a task status of a current checkpoint of the plurality of checkpoints, the task status indicating a status of one or more tasks corresponding to the current checkpoint; and
sending a report to a communication device indicating the task status of the current checkpoint, the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint.

27. An apparatus for wireless communication at a mobile communication device, comprising:
means for identifying a plurality of checkpoints for an inspection route corresponding to the mobile communication device;
means for identifying a task status of a current checkpoint of the plurality of checkpoints, the task status indicating a status of one or more tasks corresponding to the current checkpoint; and
means for sending a report to a communication device indicating the task status of the current checkpoint, the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint.

28. An apparatus for wireless communication at a network entity, comprising:
memory; and
a processor, coupled to the memory, configured to cause the apparatus to:
receive a report from a mobile communication device of an unmanned vehicle, the report indicating a task status of a current checkpoint of a plurality of checkpoints for an inspection route corresponding to the unmanned vehicle, and the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint;
identify a next checkpoint for inspection based on the task status; and
send a response to the mobile communication device indicating the next checkpoint.

29. The apparatus of claim 28, wherein the processor is further configured to cause the apparatus to:
descramble the report using a signature sequence corresponding to the mobile communication device.

30. The apparatus of claim 29, wherein the signature sequence comprises a non-orthogonal multiple access (NOMA) sequence from a pool of available NOMA sequences.

31. The apparatus of claim 30, wherein the processor is further configured to cause the apparatus to:
attempt to descramble the report using a plurality of NOMA sequences from the pool of available NOMA sequences.

32. The apparatus of claim 29, wherein the processor is further configured to cause the apparatus to:
send a message indicating the signature sequence to be used by the mobile communication device.

33. The apparatus of claim 28, wherein the processor is further configured to cause the apparatus to:
identify the plurality of checkpoints for the inspection route corresponding to the unmanned vehicle.

34. The apparatus of claim 33, wherein identifying the plurality of checkpoints comprises receiving the plurality of checkpoints from a remote server, each checkpoint associated with a geographic location and a checkpoint identifier.

35. The apparatus of claim 34, wherein each checkpoint of the plurality of checkpoints corresponds to a different checkpoint identifier.

36. The apparatus of claim 34, wherein at least one checkpoint identifier corresponds to a group of checkpoints of the plurality of checkpoints.

37. The apparatus of claim 28, wherein identifying the next checkpoint for inspection comprises selecting the next checkpoint for inspection from the plurality of checkpoints.

38. The apparatus of claim 37, wherein the current checkpoint comprises a first checkpoint and the next checkpoint comprises a second checkpoint, the second checkpoint comprises a checkpoint previous or subsequent to the first checkpoint on the inspection route, wherein selecting the second checkpoint as the next checkpoint comprises selecting based on one or more of:
whether a report has been received for the second checkpoint; or
whether at least one task of one or more tasks corresponding to the second
checkpoint was not successfully completed.

39. The apparatus of claim 37, wherein the current checkpoint comprises a first checkpoint and the next checkpoint comprises the first checkpoint, wherein selecting the first checkpoint as the next checkpoint comprises selecting based on whether at least one task of one or more tasks corresponding to the first checkpoint was not successfully completed.

40. The apparatus of claim 28, wherein the processor is further configured to cause the apparatus to:
determine an identity of the mobile communication device based on a signature sequence that successfully descrambles the report.

41. The apparatus of claim 40, wherein identifying the next checkpoint for inspection comprises identifying based on the identity.

42. The apparatus of claim 28, wherein the processor is further configured to cause the apparatus to:
allocating a resource to the mobile communication device for transmitting the report.

43. The apparatus of claim 28, wherein the plurality of checkpoints of the inspection route comprises a subset of all checkpoints for the inspection route, wherein the plurality of checkpoints for the inspection route comprises checkpoints within a geographic coverage of the network entity.

44. A method for communication with a mobile communication device, the method comprising:
- receiving, at a network entity, a report from the mobile communication device of an unmanned vehicle, the report indicating a task status of a current checkpoint of a plurality of checkpoints for an inspection route corresponding to the unmanned vehicle, and the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint;
- identifying a next checkpoint for inspection based on the task status; and
- sending a response to the mobile communication device indicating the next checkpoint.

45. An apparatus for wireless communication at a mobile communication device, comprising:
- means for receiving, at a network entity, a report from the mobile communication device of an unmanned vehicle, the report indicating a task status of a current checkpoint of a plurality of checkpoints for an inspection route corresponding to the unmanned vehicle, and the report being sent via a low data rate connection based at least in part on a location of the current checkpoint, wherein a quantity of bits of the report is equal to a quantity of tasks associated with the current checkpoint plus a quantity of bits for communicating a checkpoint identifier for the current checkpoint;
- means for identifying a next checkpoint for inspection based on the task status; and
- means for sending a response to the mobile communication device indicating the next checkpoint.

46. The apparatus of claim 1, wherein the quantity of bits for communicating the checkpoint identifier for the current checkpoint is zero.

* * * * *